(No Model.)

E. B. W. REICHEL & F. W. V. STEIN.
MOUNTING FOR ELECTRIC MOTORS.

No. 605,679. Patented June 14, 1898.

Witnesses:

Inventors
Emil Berthold W. Reichel,
Friedrich Wilhelm V. Stein,
By Barton & Brown
Attorneys.

UNITED STATES PATENT OFFICE.

EMIL BERTHOLD WALTER REICHEL AND FRIEDRICH WILHELM VICTOR STEIN, OF BERLIN, GERMANY, ASSIGNORS TO THE SIEMENS & HALSKE ELECTRIC COMPANY OF AMERICA, OF CHICAGO, ILLINOIS.

MOUNTING FOR ELECTRIC MOTORS.

SPECIFICATION forming part of Letters Patent No. 605,679, dated June 14, 1898.

Application filed January 27, 1898. Serial No. 668,153. (No model.)

*To all whom it may concern:*

Be it known that we, EMIL BERTHOLD WALTER REICHEL and FRIEDRICH WILHELM VICTOR STEIN, subjects of the Emperor of Germany, residing at Berlin, Germany, have invented new and useful Improvements in Mountings for Electric Motors, (Case No. 126,) of which the following is a specification, reference being had to the accompanying drawings, forming a part of this specification.

Our invention relates to an improved mounting for electric motors of a car or vehicle, and has for its object the provision of a support for such motors which will equalize the strain upon the connected parts and minimize the shocks attendent upon starting the motors or suddenly altering their rate of speed. This is accomplished in the support of our invention by suspending the motors directly connected upon the axles of the driven car or vehicle in the usual manner by means of a cross part or coupling preferably supported upon springs and attached to the said motors by means of non-rigid connections, while the motors are provided with supplemental connecting parts permitting a slight conjoint movement thereof about their respective axles.

Our invention will be more readily understood by reference to the accompanying drawings, wherein—

Figure 1:
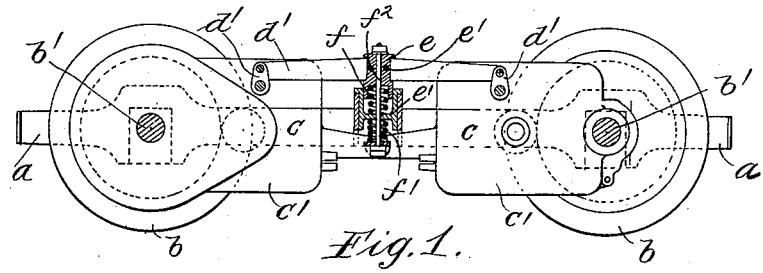
Figure 2:
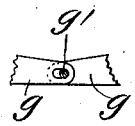
Figure 3:
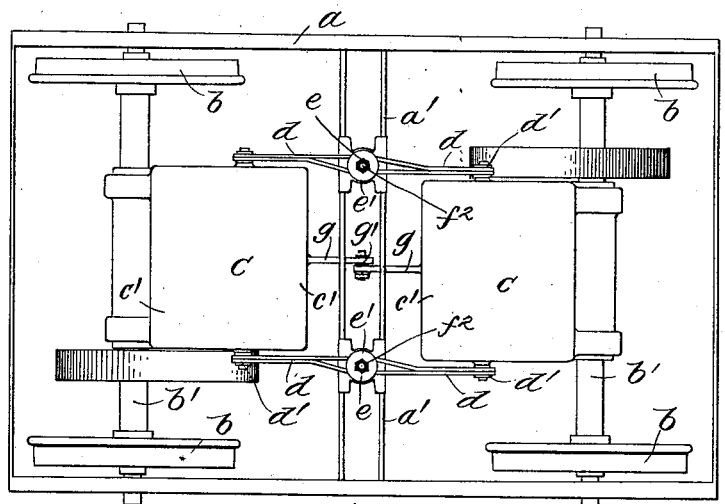

Figure 1 is a view, partly in vertical section, of a car-truck equipped with motors mounted in accordance with our invention. Fig. 2 is a detail of the supplemental motor connection, and Fig. 3 is a plan view of the said truck and connected motors.

The same letter of reference is used to designate like parts in the several figures of the drawings.

The car-truck $a$ is provided with the wheels $b$, suitably mounted therein upon the axles $b'$, the motors $c$ being directly connected to the axles and adapted to drive the car through intermeshing gear-wheels in the usual manner. The cross-beam $a'$ carries the supporting-rods $d$, which are united with the motors $c$ by means of links $d'$ at points lying in or substantially in the vertical planes of their centers of gravity. The said supporting-rods $d$ are mounted in spring-carriages $e$, consisting of supporting parts $e'$ and opposing springs $f f'$, the said springs being disposed upon either side of the cross-beam $a'$ and secured to the supporting member by means of the bolts $f^2$.

The motors are indicated as being inclosed within the casings $c'$, which also inclose the gearing, lugs $g$ being cast upon the lower portions of the said casings, which are slotted and connected by means of a bolt $g'$, extending through the slots. In some instances, however, it may be desirable to yieldingly connect the said motors instead of securing them together by means of the rigid lugs $g$. The motors as thus mounted, it will be seen, are centrally supported in the planes of their respective centers of gravity upon the spring-carriages $e$ through the intermediate supporting-rods $d$ and the several link-mountings $d'$. They are also securely connected below the spring-carriages by means of the lugs $g$, which, however, permit of a slight compensating rotary movement of the said motors about the respective axles $b'$. As thus connected upon the opposite sides of the main gear-wheels mounted upon the axles of the car the tendency of the motors is to oppose one another in said rotary movement about the axles. In addition to this the spring-carriages $e$ and their connected parts serve to yieldingly support the said motors and minimize any shocks that may be occasioned when current is switched through the motors to propel the car or when the trucks are subjected to serious vibrations. The present form of mounting, moreover, serves to counterbalance any inequalities in the respective powers of the motors and prolongs the life of the machinery.

It is obvious that the device of the present application is capable of numerous modifications without departing from the spirit of our invention, and we do not desire to be understood as limiting ourselves to the exact form of motor-support herein shown and described.

We claim, therefore, and desire to secure by these Letters Patent, the following:

1. In a support for electric motors, the combination with a spring-carriage carried upon a relatively stationary part maintained between the said motors, of a supporting-rod, means for connecting the said motors upon opposite sides of the spring-carriage with the supporting-rod, and a supplemental connection tending to secure the conjoint movement of said motors, substantially as described.

2. The herein-described mounting for motors of electrically-propelled vehicles, consisting of a spring-carriage mounted upon the truck of the said vehicle, a supporting-rod carried by said spring-carriage whereon the motors are mounted upon either side of said spring-carriage, a non-rigid mounting connecting said supporting-rod and motors, and a supplemental or secondary connecting part uniting said motors.

3. In a motor-support for electrically-propelled vehicles, the combination with a spring-carriage having opposing springs $ff'$ mounted upon a cross-beam $a'$, of supporting-rods $d$ carried by said spring-carriage, motors $c$ mounted at either end of the supporting-rods by means of link connections $d'$, and lugs $g$ forming secondary connections for said motors, substantially as described.

4. The combination with the truck of an electrically-driven vehicle, of motors $c$ connected with the axles of the wheels, spring-carriages $e$ consisting of supporting parts $e'$ and opposing springs $ff'$ mounted upon a cross-beam $a'$ of the said truck, supporting-rods $d$ carried upon said spring-carriages, link connections $d'$ uniting the said motors with the supporting-rods upon either side of the spring-carriages, and slotted lugs $g$ united to form a supplemental connection for the said motors, substantially as described.

5. The herein-described motor-supporting truck, having a spring-carriage supported upon a relatively stationary part, two motors respectively disposed upon either side thereof, a supporting-rod mounted upon the spring-carriage, non-rigid connections uniting the supporting-rod and motors approximately in the planes of the motors' centers of gravity, and a supplemental or secondary connecting part uniting said motors.

6. The combination in a truck for electrically-driven vehicles with two propelling-motors, of a supporting rod or rods connected thereto approximately in the vertical planes of their centers of gravity, means for supporting said rod or rods, and supplemental connections uniting the said motors, whereby their motions are substantially equalized, substantially as described.

In testimony whereof we affix our signatures in the presence of two witnesses.

EMIL BERTHOLD WALTER REICHEL.
FRIEDRICH WILHELM VICTOR STEIN.

Witnesses:
CHAS. H. DAY,
HENRY HASPER.